(12) United States Patent
Uchio et al.

(10) Patent No.: US 6,353,217 B1
(45) Date of Patent: Mar. 5, 2002

(54) TRANSMITTER RECEIVER

(75) Inventors: Masatoshi Uchio; Shinichi Higuchi, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/241,383

(22) Filed: Feb. 2, 1999

(30) Foreign Application Priority Data

Feb. 4, 1998 (JP) .......................................... 10-023059

(51) Int. Cl.$^7$ ................................................ G06F 3/033
(52) U.S. Cl. .................................. 250/214 R; 250/553
(58) Field of Search ............................ 250/216, 214 R, 250/208.2, 552, 553; 356/141.2, 141.3; 257/88, 98, 99; 362/236, 244; 345/157, 158

(56) References Cited

U.S. PATENT DOCUMENTS

| | | | | |
|---|---|---|---|---|
| 5,835,209 A | * | 11/1998 | Umeda et al. | 356/141.3 |
| 5,841,154 A | * | 11/1998 | Uchio et al. | 257/99 |
| 5,893,633 A | * | 4/1999 | Uchio et al. | 362/244 |
| 5,949,403 A | * | 9/1999 | Umeda et al. | 345/157 |

* cited by examiner

*Primary Examiner*—John R. Lee
(74) *Attorney, Agent, or Firm*—Brinks Hofer Gilson & Lione

(57) ABSTRACT

In the transmitter receiver of the present invention, a light-shielding sheet is arranged in front of a light-emitting portion having a LED whose light-emitting central axis is inclined and an aperture from which only the head of the light-emitting portion is exposed is made in the light-shielding sheet. The light-shielding sheet masks the inclined side portion of the light-emitting portion to prevent a light-receiving portion from detecting the light leaking from the inclined side portion. Therefore, the light-receiving portion can detect with high accuracy a change in the amount of light emission that is produced by a change in the direction of the light-emitting portion.

4 Claims, 6 Drawing Sheets

TRANSMITTER RECEIVER

BACKGROUND OF THE INVENTION

1. Field of the Invention

The present invention relates to a transmitter receiver which compares the intensities of light emitted by light-emitting portions provided with light-emitting diodes and detects a change in a relative inclination angle between a transmitting side and a receiving side, and in particular, to a transmitter receiver which can shield field inflection points of the light intensity distributions of the light-emitting portions.

2. Description of the Related Art

FIG. 6 is a perspective view of a pointer 1 of a wireless type which is used as a transmitter in the input device of a computer and can be operated by hand in a space. FIG. 7 is a cross sectional view illustrating the light-emitting portion of the pointer 1 and FIG. 8 is a front view of the light-emitting portion of the pointer 1.

The pointer 1, as shown in FIG. 8, comprises five light-emitting diodes (hereinafter referred to as LED") 2a, 2b, 2c, 2d, and 2e built in a box-shaped housing in a line, and the LEDs emit infrared light in previously determined order to freely move a cursor on the screen of a display in response to the movement of the pointer 1.

The LED mounted in the light-emitting portion has a light-emitting directivity and, as shown in FIG. 6, a light-emitting central axis Oa of the LED 2a at the center faces the front (Z direction), where the light-emitting central axis is the direction in which the intensity of light emission is the largest, and the light-emitting central axes Ob and Oc of the LEDs 2b and 2c of the light-emitting portions formed in a pair at both ends are inclined inward (in the X direction) in the direction opposite to each other and are used to control the cursor in the right-left direction (in the X direction).

Further, the light-emitting central axes Od and Oe of the LEDs 2d and 2e of the remaining light-emitting portions formed in a pair are inclined in the up-down direction (in the Y direction) in the direction opposite to each other and are used to control the cursor in the up-down direction (in the Y direction).

In this pointer 1, as shown in FIG. 8, five LEDs 2a, 2b, 2c, 2d and 2e emit light consecutively in pairs including central LED 2a, that is, LEDs 2a+2b, LEDs 2a+2c, LEDs 2a+2d, LEDs 2a+2e, in previously predetermined order, and the consecutive light emission is repeated cyclically at predetermined intervals.

A personal computer which is made a receiver is provided with a light-receiving portion 8 and, as shown in FIG. 9, a detecting section 9 for comparing the intensity of light received by the light-receiving portion 8 to detect a change in relative inclination angle of the pointer 1 between the transmitter and the receiver.

FIG. 9 shows a state in which the pointer 1 is inclined to the X (+) side with respect to the light-receiving portion 8 provided in the receiver.

Since the light-emitting central axes Ob and Oc of the LEDs 2b and 2c arranged in the right and left sides are inclined in the X direction in the direction opposite to each other, in the state in FIG. 9, the light-emitting central axis Ob of the LED 2b is inclined in the direction of the light-receiving portion 8 and the light-emitting central axis Oc of the LED 2c is inclined in the direction away from the light-receiving portion 8. Therefore, the intensity of light received by the light-receiving portion 8 is stronger in the LEDs 2a+2b than in the LEDs 2a+2c. The detecting section 9 compares the intensities of light received by the light-receiving portions and calculates the amount of inclination of the pointer 1 in the X (+) direction, whereby the cursor on the screen of the personal computer is moved in the X (+) direction.

The inclination of the pointer 1 in the Y direction can be calculated in the same way by comparing the intensity of light emitted by the LEDs 2a+2d with the intensity of light emitted by the LEDs 2a+2e.

FIG. 7 is a cross sectional plan view of a light-emitting portion arranged at the left end of the pointer 1.

As shown in FIG. 7, the light-emitting portion provided with the LED 2b has a holder 1a formed of transparent resin at the front of the case of the pointer 1, and the LED 2b is inserted from the back side into a projecting cover 1b integrally formed with the front of the holder 1a. The LED 2b comprises a light-emitting chip 6 arranged in the case 4 made of transparent resin and a reflecting plate 7 arranged at the back of the light-emitting chip 6.

FIG. 9 schematically shows the light intensity distributions of the light-emitting portions provided with the LEDs 2b and 2c. The light intensity distributions Lb and Lc have peaks Pb1 and Pc1 on the light-emitting central axes Ob and Oc.

In the LED 2b, the case 4 and the cover 1b function as a lens to shape light-emitting fields in the direction of the axes Ob1 and Oc1, which can enlarge the range of detection of inclination angle of the pointer 1 with respect to the Z axis and improve the quality of detection.

However, light leaking from the sides of the case 4 and the cover 1b shows field inflection portions Pb2 and Pc3 produced by reflection and refraction on the spherical surface and inclined surface of the case 4 and the cover 1b.

The field inflection points Pb2 and Pc3 produced by the light leaking from an inclined side portion (i) that faces the direction of Z, that is, the direction of the light-receiving portion 8, because the light-emitting central axes Ob and Oc are inclined, have a great effect on the angle detection intensity distribution. For example, in the state in FIG. 9, since the light-emitting central axis Ob of the LED 2b is greatly inclined in the Z direction, the intensity of light to the Z direction ought to decrease, but the light-receiving point 8 receives light stronger than inherent light from the LED 2b under the influence of the field inflection portion Pb2 caused by light leaking from the inclined side portion (i).

Accordingly, when the detecting section 9 determines a difference in the intensity of light emission between the LED 2b and the LED 2c and calculates a relative inclination angle of the light-receiving portion 8 to the pointer 1, it calculates an inclination angle different from the actual angle because of the field inflection point Pb2. Therefore, for example, there tends to be provided the problems that when the pointer 1 is inclined gradually in the X (+) direction from the Z direction, the cursor moving to the X (+) direction on the screen is suddenly moved opposite in the X (−) direction or is stopped on the way.

SUMMARY OF THE INVENTION

The present invention is made so as to solve the above-mentioned conventional problems. An object of the present invention is to provide a transmitter receiver which can detect a difference in the intensity of light emission between light-emitting portions without influence of the field inflection points of the light-emitting portions.

Another object of the present invention is to provide a transmitter receiver whose member for masking the light-emitting portions is hard to deviate in position where it masks the light-emitting portions.

The present invention provides a transmitter receiver comprising: a transmitter including pairs of light-emitting portions having directivity, the light-emitting portions being arranged such that the light-emitting central axes of each pair of light-emitting portions are inclined in the directions opposite to each other in the case where the light-emitting central axis is the direction in which the intensity of light emitted by the light-emitting portion is the strongest; a receiver including a light-receiving portion that receives light emitted by the pairs of light-emitting portions; and a detecting section that compares the intensities of light received by the receiver and detects a change in the relative angle between the receiver and the transmitter, wherein a mask is provided for masking the inclined side portions of the pairs of light-emitting portions that face the light-receiving portion because the light-emitting central axes are inclined.

According to the present invention, the mask for masking the inclined side portions of the light-emitting portions can prevent an error in detection caused by a disturbance in field at the field inflection points Pb2 and Pc3 of a light intensity distribution shown in FIG. 9.

For example, the transmitter is provided with two pairs of light-emitting portions, the light-emitting central axes of one pair of light-emitting portions being inclined in the direction at right angles to the direction in which the light-emitting central axes of the other pair of light-emitting portions are inclined.

The mask can be formed of a sheet having apertures from which the light-emitting portions are exposed. In this respect, it is preferable that the side of the aperture of the mask for masking the inclined side portion of the light-emitting portion is shaped into a straight line at right angles to the direction in which the light-emitting central axis is inclined. If the side of the aperture of the mask for masking the inclined side portion of the light-emitting portion is shaped into a straight line, it can prevent the masked region of the inclined side portions from being varied when the sheet is deviated in the position.

Further, it is preferable that the side opposed to the straight side of the aperture is shaped into a curve like a circular arc, a sector or the like. If the aperture is shaped into the curve, even if the interval of neighboring light-emitting portions is narrow, the neighboring apertures of the sheet can be prevented from being connected to each other.

However, the mask is not necessarily formed of one sheet and the light-emitting portions may be provided with different masks.

DESCRIPTION OF THE PREFERRED EMBODIMENTS

Figure 1:
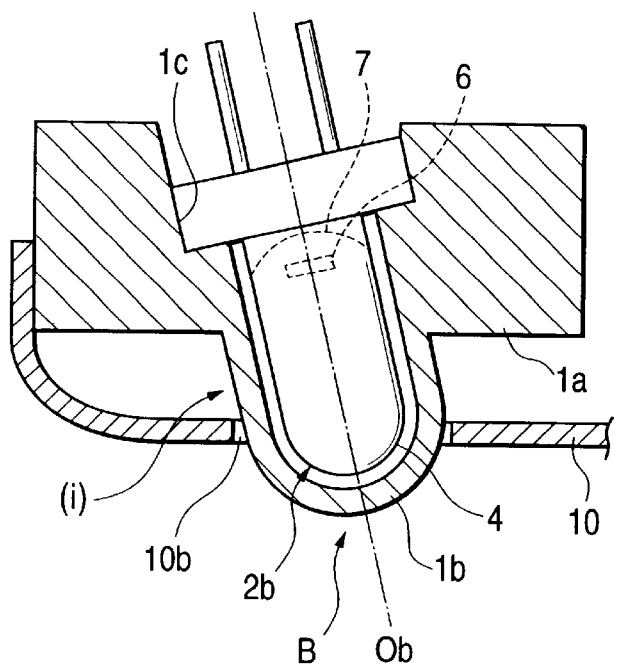
FIG. 1 is a cross sectional plan view of the light-emitting portion of a transmitter receiver according to the present invention.
Figure 2:
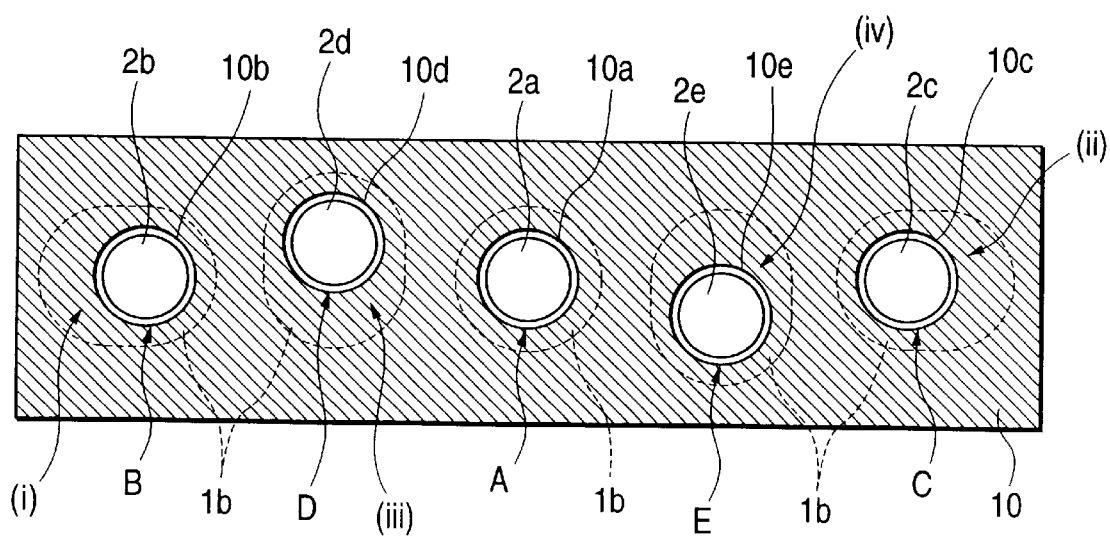
FIG. 2 is a front view of a pointer which is made a transmitter.
Figure 2:
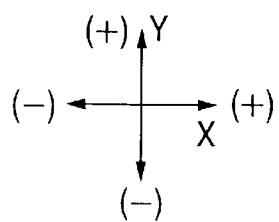
Figure 7:
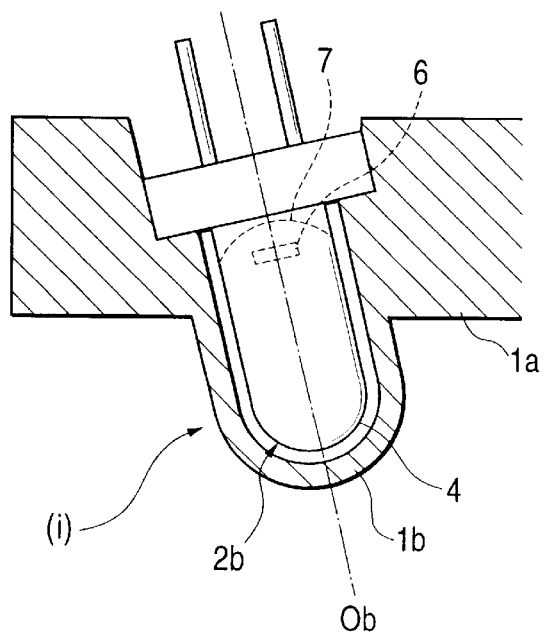
FIG. 7 is a cross sectional plan view of a conventional light-emitting portion.
Figure 8:
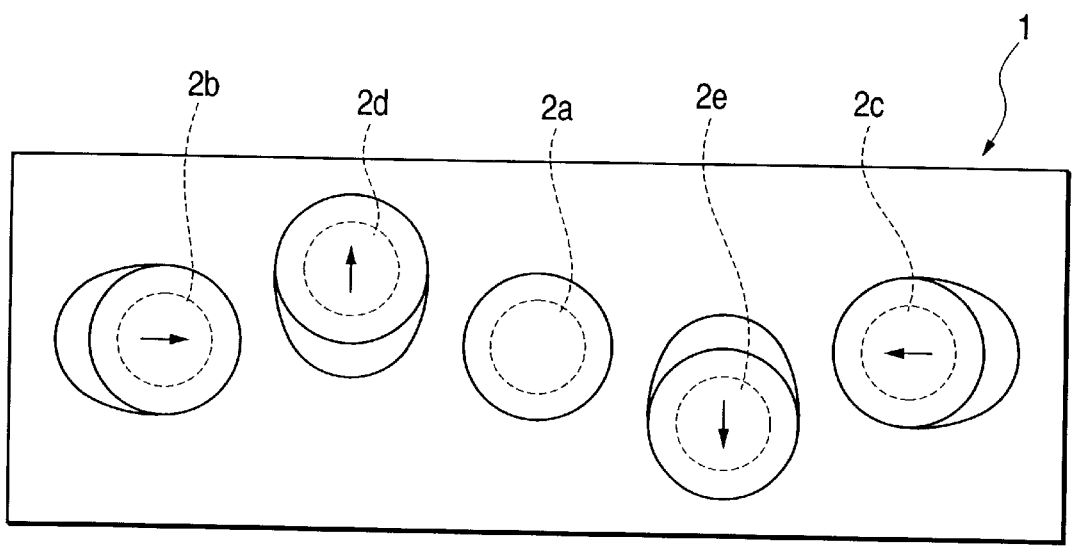
FIG. 8 is a front view of a conventional pointer.

FIG. 1 illustrates a light-emitting portion of a transmitter of a transmitter receiver according to the present invention and is a cross sectional plan view similar to FIG. 7. FIG. 2 is a front view of the light-emitting portion.

Figure 6:
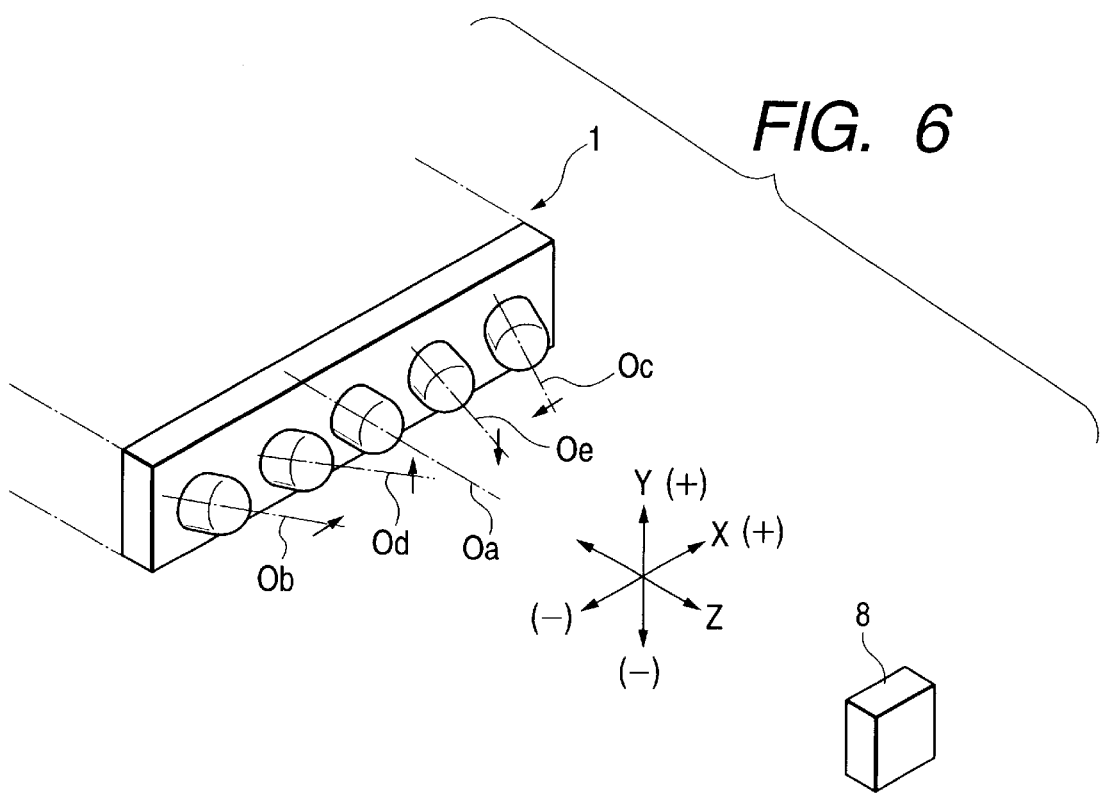
FIG. 6 is a general constitution of a transmitter receiver.

The transmitter receiver according to the present invention is basically the same as the one illustrated in FIG. 6. A pointer 1 which is a transmitter is provided with a light-emitting portion A having a light-emitting diode (LED) $2a$ facing in the Z direction, light-emitting portions B and C having LEDs $2b$ and $2c$ whose light-emitting central axes Ob and Oc are inclined inward (in the X direction) in the direction opposite to each other, and light-emitting portions D and E having LEDs $2d$ and $2e$ whose light-emitting central axes Od and Oe are inclined in the vertical direction (in the Y direction) in the direction opposite to each other.

These light-emitting portions A to E emit light consecutively in pairs of LEDs $2a+2b$, LEDs $2a+2c$, LEDs $2a+2d$, LEDs $2a+2e$, in previously predetermined order, and the consecutive light emission is repeated cyclically at predetermined intervals. When a light-receiving portion 8 of a receiver arranged opposite to the pointer 1 detects the light emitted by the pointer 1, a detecting section 9 compares the intensity of light emitted by the LED $2b$ and received by the light-receiving portion 8 with the intensity of light emitted by the LED $2c$ and received by the light-receiving portion 8 and calculates the inclination angle of the pointer 1 in the X direction. Similarly, the detecting section 9 compares the intensity of light emitted by the LED $2d$ and received by the light-receiving portion 8 with the intensity of light emitted by the LED $2e$ and received by the light-receiving portion 8 and calculates the inclination angle of the pointer 1 in the Y direction. The calculated results of the detecting section 9 are sent to the controlling section such as a personal computer and a cursor on a screen is moved in response to the inclination angle of the pointer 1.

FIG. 1 is across sectional view of light-emitting portion B and the LED $2b$ is received in a cover $1b$ integrally formed with the transparent holder $1a$ of the pointer 1. The holder $1a$ is shaped like a cylinder having a cutout $1c$ in a part of the periphery of the base thereof and a nearly cylindrical cover $1b$ with a spherical top is integrally formed with the front of the holder $1a$. The inclination of the central axis of the nearly cylindrical cover $1b$ corresponds to the inclination of the light-emitting central axis Ob of the LED $2b$.

The cutout $1c$ of the holder $1a$ plays a role in positioning the LED $2b$ when it is built in the holder $1a$ and each of four holders other than the holder $1a$ has a cutout $1c$ made in the same direction. Since each LED is fixed in the holder with a guide of the cutout $1c$, the light-emitting axis of the LED can be oriented in the same direction, which can reduce the deviations in light-emitting axes caused by variations in manufacturing the LEDs.

The structure of the light-emitting portion other than the light-emitting portion B is the same as FIG. 1 and it is only in the direction of inclination of the light-emitting central axis that the light-emitting portions are different from each other.

As shown in FIG. 2, a light-shielding sheet 10 is fixed to the front of the holder 1a of the pointer 1. The light-shielding sheet 10 functions as a mask for covering the unnecessary portion of the light-emitting portion and has apertures 10a, 10b, 10c, 10d, and 10e corresponding to the light-emitting portions A, B, C, D, and E.

In the preferred embodiment illustrated in FIG. 2, the apertures 10a, 10b, 10c, 10d, and 10e are circular and, as shown in FIG. 1, in the light-emitting portions A, B, C, D, and E, only the spherical portion of the top of the cover 1b is almost exposed from the apertures 10a, 10b, 10c, 10d, and 10e and the base portion thereof is covered by the light-shielding sheet 10.

Therefore, as shown in FIG. 2, since the light-emitting central axis Ob is inclined toward the X (+) side in the light-emitting portion B, an inclined side portion (i) facing the Z direction (direction of the light-receiving portion 8) is masked by the light-shielding sheet 10. Because the light-emitting central axis Oc is inclined toward the X (−) side, also in the light-emitting portion C pairing with the light-emitting portion B, an inclined side portion (ii) facing the Z direction is masked by the light-shielding sheet 10. Similarly, in a pair of light-emitting portions D and E, an inclined side portion (iii) facing the Z direction is masked by the light-shielding sheet 10, because the light-emitting central axis Od is inclined toward the Y (+) side, and an inclined side portion (iv) facing the Z direction is masked by the light-shielding sheet 10, because the light-emitting central axis Oe is inclined toward the Y (−) side.

Figure 9:
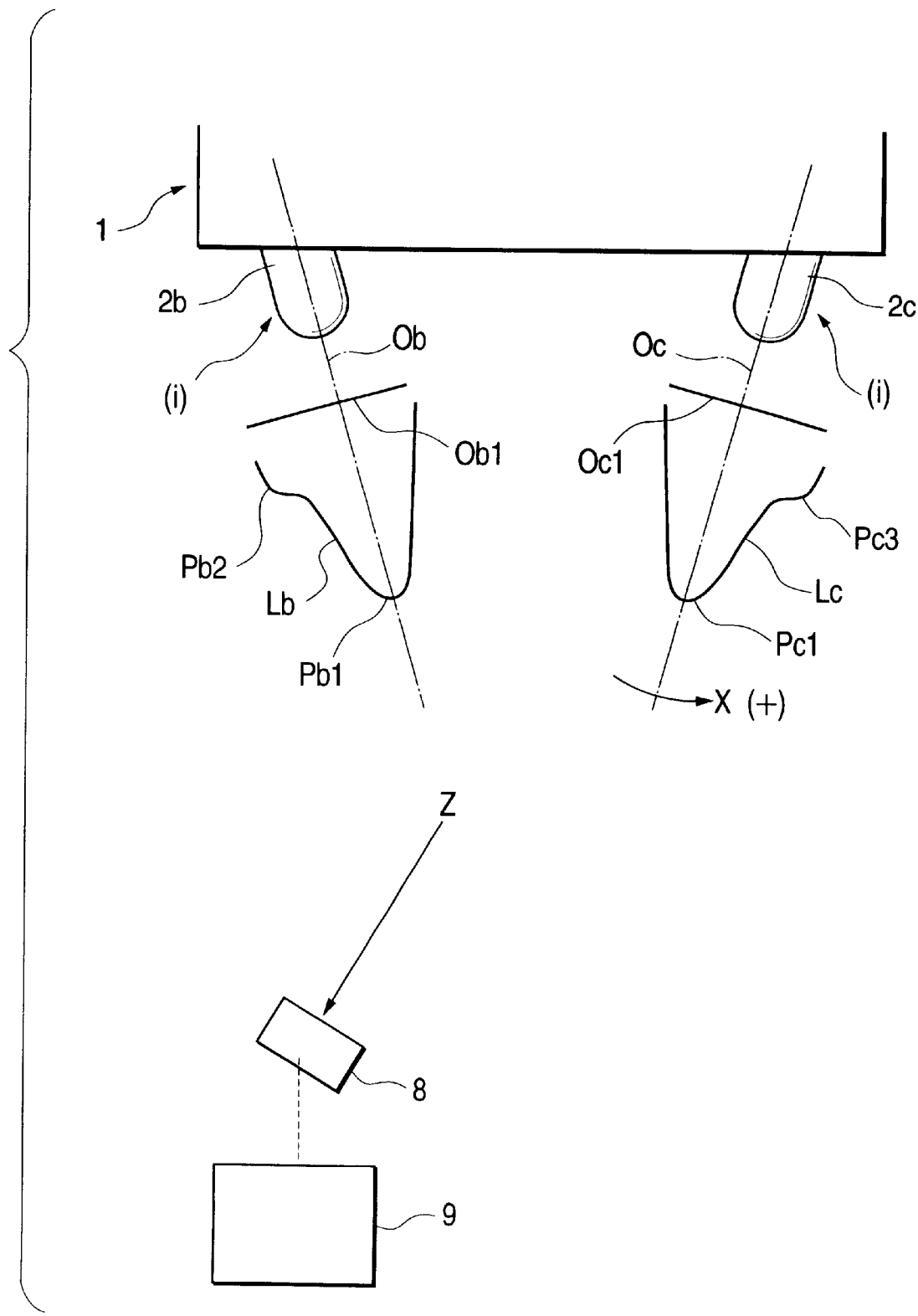
FIG. 9 illustrates the action of a transmitter receiver.

As described in FIG. 9, each light-emitting portion has an inflection point in the intensity of light emission in the direction of light-emitting central axis and a field inflection point (for example, Pb2 or Pc3) where the intensity of light emission is increased when the inclined side portion is oriented. However, since the inclined side portion which produces the inflection point is masked as described above, the detecting section 9 does not introduce an error in calculating the angle of inclination.

For example, as shown in FIG. 9, when the pointer 1 is inclined a predetermined angle toward the X (+) side with respect to the Z direction, the light-emitting central axis Ob of the LED 2b is pointed at the light-receiving portion 8 and the light-emitting central axis Oc of the LED 2c is pointed in the direction away from the light-receiving portion 8. In this regard, since the inclined side portion (i) of the LED 2b is masked, the field inflection point Pb2 in the intensity of light emission is not detected by the light-receiving portion 8. Therefore, the detecting section 9 can calculate the inclination angle of the pointer 1 with respect to the Z direction precisely by determining a difference between the intensity of light emitted by the LED 2b and received by the light-receiving portion 8 and the intensity of light emitted by the LED 2c and received by the light-receiving portion 8.

Figure 3:
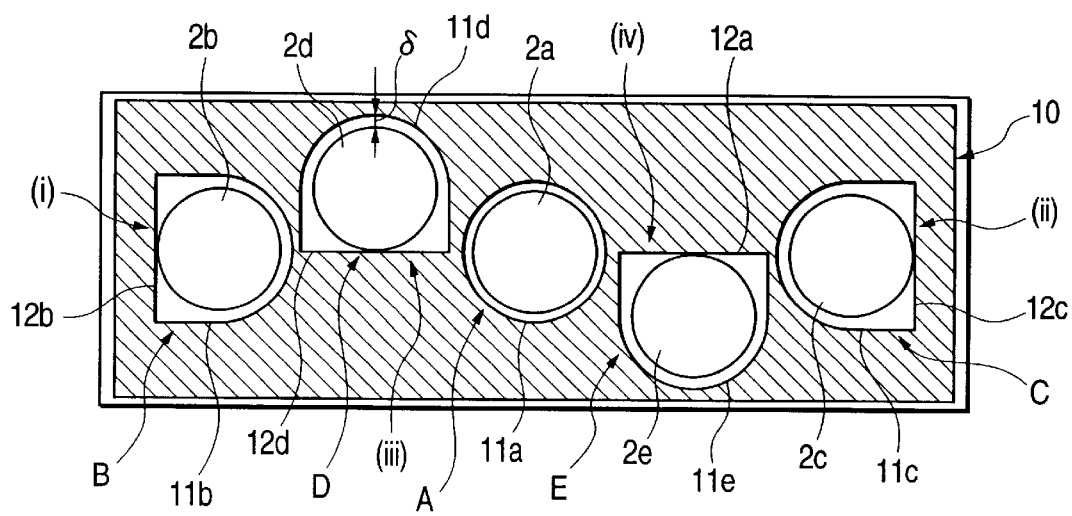
FIG. 3 is a front view of a preferred embodiment having the other type of light-shielding sheet.
Figure 4:
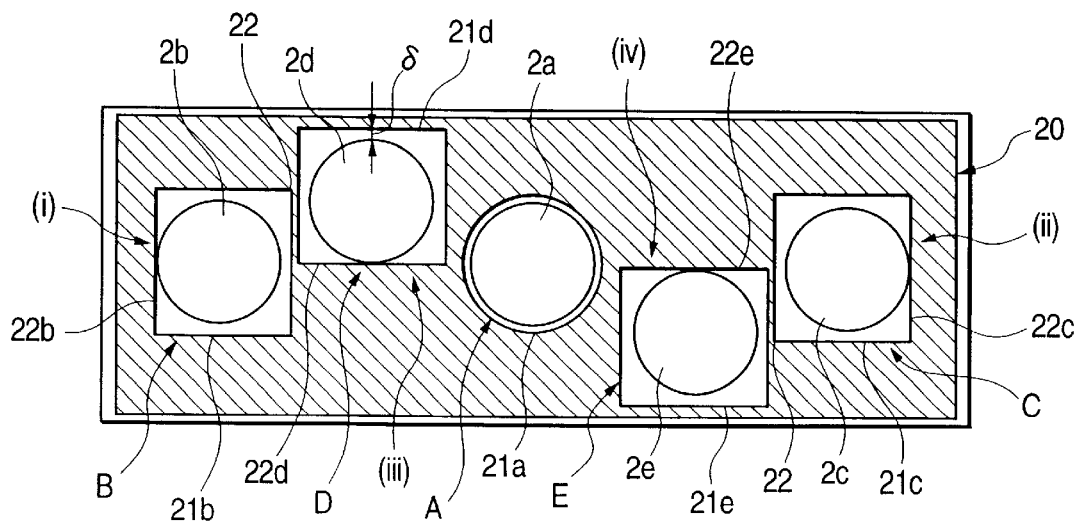
FIG. 4 is a front view of a modification of the light-shielding sheet shown in FIG. 3.

FIG. 3 is a front view of a light-shielding sheet 10 of the other preferred embodiment of the present invention and FIG. 4 is a modification of the light-shielding sheet 10.

The light-shielding sheet 10 shown in FIG. 3 is made of one sheet 11 which masks the cover 1b of the light-emitting portions A, B, C, D, and E and has apertures (cutout portion) 11a, 11b, 11c, 11d, and 11e, and the top of the cover 1b (spherical portion) covering each of the LEDs 2a to 2e is projected from the aperture. Each of the apertures 11b, 11c, 11d, and 11e is made straight at one side of the contour and the straight side masks the inclined side portion of the LED.

That is, in the light-emitting portion B, since the light-emitting central axis Ob is inclined toward the X (+) direction, the straight portion 12b of the aperture 11b is in the X (−) side and masks the inclined side portion (i) and the straight portion 12b extends in the Y direction at right angles to the direction in which the light-emitting central axis Ob is inclined. In the light-emitting portion C, the straight portion 12c of the aperture 11c is in the X (+) side opposite to the direction in which the light-emitting central axis Oc is inclined and masks the inclined side portion (ii), and the straight portion 12c extends in the Y direction at right angles to the direction in which the light-emitting central axis Oc is inclined.

Similarly, in the light-emitting portion D, the straight portion 12d of the aperture lid masks the inclined side portion (iii) produced by the inclination of the light-emitting central axis Od toward the Y (+) direction and the straight portion 12d extends in the X direction. Further, in the light-emitting portion E, the straight portion 12e of the aperture lie is at the position where it masks the inclined side portion (iv) and the straight portion 12e extends in the X direction.

Further, in the apertures 11b, 11c, 11d, and 11e, the contour opposite to the straight portions 12b, 12c, 12d, and 12e are shaped like a circle. Still further, the diameter of the circular portion is formed on the larger side so as to have a clearance δ between the circular contour and the outer periphery of the case 4 of the LED. However, the apertures 11b, 11c, 11d, and 11e are made such that the straight portions 12b, 12c, 12d, and 12e are arranged with high accuracy in the relative position between them.

In this respect, the aperture 11a of the light-emitting portion A at the center is circular.

Furthermore, the light-shielding sheet 10 is opaque so that it can shield infrared light emitted by the LEDs 2a, 2b, 2c, 2d, and 2e and is made of flexible material so that it can mask the inclined side portions (i) to (iv) and only the head of the light-emitting portion is exposed from the light-shielding sheet 10.

Figure 5A:
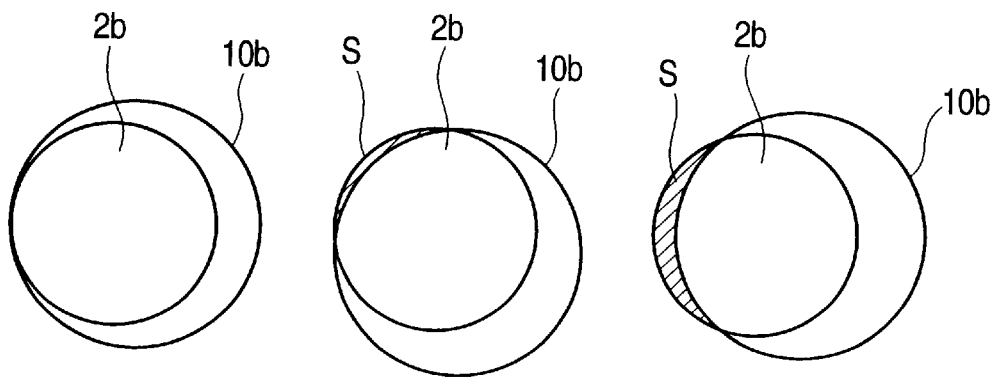
FIGS. 5A and 5B illustrate a difference in effect caused by the position deviation of the light-shielding sheet between FIG. 2 and FIG. 3.
Figure 5A:
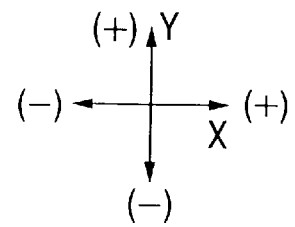
Figure 5B:
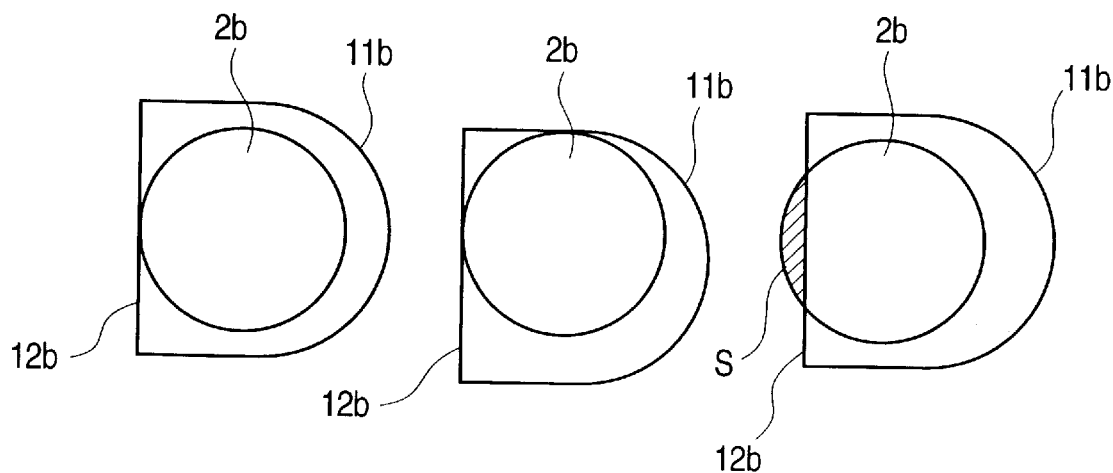

FIG. 5A and FIG. 5B shows a comparison of the effect caused by the position deviation of the light-shielding sheet 10 between FIG. 2 and FIG. 3.

In FIG. 5A and FIG. 5B, the drawing at the left end shows a case in which the aperture 10b or 11b is deviated to the X (+) side with respect to the LED 2b, and the drawing at the center shows a case in which the aperture 10b or 11b is deviated to the Y (−) side with respect to the LED 2b, and the drawing at the right end shows a case in which the aperture 10b or 11b is deviated to the X (−) side with respect to the LED 2b. In this respect, in FIG. 5A and FIG. 5B, the amount of deviation of the aperture 10b is the same as that of the aperture 11b.

As is evident from the drawings at the centers of FIG. 5A and FIG. 5B, when the aperture 10b is circular, if the aperture 10b is deviated to the Y direction, there is provided a region S where the light-shielding sheet 10 masks the LED 2b, but when the aperture 11b has the straight portion 12b, even if the aperture 11b is deviated in the Y direction, there is not provided a region S where the light-shielding sheet 10 masks the LED 2b.

In each drawing at the right end in FIG. 5A and FIG. 5B, there is provided a region S where the light-shielding sheet 10 masks the light emitted by the LED 2b, but the area of the region S is smaller for the aperture 1b having the straight portion 12b than for the circular aperture 10b. This relationship is the same for the other light-emitting portions C, D, and E.

As is described above, the aperture having the straight portion can prevent the effect caused by the deviation of the light-shielding sheet 10, that is, the excessive masking of the distribution of-light emitted by the light-emitting portion.

Further, since the straight portion of the aperture is formed at the position where it masks the inclined side portion of the light-emitting portion, as shown in the drawing at the right end in FIG. 5B, the light-shielding sheet 10 can effectively mask the inclined side portion in the main and does not have harmful effect on the intensity of light emission in the other region.

Next, a light-shielding sheet 20 shown in FIG. 4 is made of one sheet 21 and has apertures 21a, 21b, 21c, 21d, and 21e from which only the heads of the light-emitting portions provided with the LEDs 2a, 2b, 2c, 2d, and 2e are exposed. In the apertures 21b, 21c, 21d, and 21e, the straight portions 22b, 22c, 22d, and 22e mask the inclined side portions of the LEDs and are shaped like the straight portions 12b, 12c, 12d, and 12e in FIG. 3, and further, the sides of the apertures other than the straight portions 22b, 22c, 22d, and 22e are also straight. Therefore, the apertures 21b, 21c, 21d, and 21e are rectangular (square).

Accordingly, the light-shielding sheet shown in FIG. 4 has the same effect as the light-shielding sheet shown in FIG. 3 in that it can shield the inclined side portions (i), (ii), (iii), and (iv) of the light-emitting portions and that it is little affected by the position deviation of the light-shielding sheet.

However, if the aperture 21b, 21c, 21d, and 21e are rectangular, that is, all sides of the apertures are straight, the apertures 21b and 21d are brought very close to each other at the boundary 22 and the apertures 21c and 21e are brought very close to each other at the boundary 22 and hence the boundaries 22 might be broken, whereby the apertures 21b and 21d, and the apertures 21c and 21e might be connected to each other. Accordingly, from this viewpoint, as shown in FIG. 3, it is preferable that the sides of the aperture other than the straight portion are circular.

As described above, in the transmitter receiver, which detects the relative inclination of the transmitter and the receiver by comparing the amount of light emission between the light-emitting portions whose light-emitting central axes are inclined, the present invention can prevent an error in detecting the angle of inclination from being caused by the light leaking from the inclined side portion of the light-emitting portion.

Further, if a mask is formed of a sheet, the present invention can reduce to a minimum the effect of the position deviation of the light-emitting portion from the aperture from which the light-emitting portion is exposed.

What is claimed is:

1. A transmitter receiver comprising:
a transmitter including pairs of light-emitting portions having directivity, the light-emitting portions being arranged such that the light-emitting central axes of each pair of light-emitting portions are inclined in the directions opposite to each other in the case where the light-emitting central axis is the direction in which the intensity of light emitted by the light-emitting portion is the strongest; a receiver including a light-receiving portion that receives light emitted by the pairs of light-emitting portions; and a detecting section that compares the intensities of light received by the receiver and detects a change in the relative angle between the receiver and the transmitter,
wherein a mask is provided for masking the inclined side portions of the pairs of light-emitting portions that face the light-receiving portion because the light-emitting central axes are inclined.

2. A transmitter receiver according to claim 1, wherein the transmitter is provided with two pairs of light-emitting portions and the light-emitting central axes of one pair of light-emitting portions are inclined in the direction at right angles to the direction in which the light-emitting central axes of the other pair of light-emitting portions are inclined.

3. A transmitter receiver according to claim 1, wherein the mask is formed of a sheet having apertures from which the light-emitting portions are exposed.

4. A transmitter receiver according to claim 1, wherein the side of the aperture masking the inclined side portion of the light-emitting portion is shaped into a straight line at right angles to the direction in which the light-emitting central axis is inclined.

* * * * *